3,069,404
POLYMERIZATION OF ETHYLENICALLY UNSATURATED COMPOUNDS WITH BIS(TRIFLUOROMETHYL)PEROXIDE AS POLYMERIZATION INITIATOR
Robert A. Darby and Ellsworth K. Ellingboe, Wilmington, Del., assignors to E. I. du Pont de Nemours and Company, Wilmington, Del., a corporation of Delaware
No Drawing. Filed Jan. 14, 1960, Ser. No. 2,335
12 Claims. (Cl. 260—92.1)

This invention relates to the polymerization of polymerizable organic compounds. More particularly, it relates to a process for polymerizing ethylenically unsaturated compounds by means of a new polymerization initiator.

The organic peroxides commonly used as inititaors for the polymerization of ethylenically unsaturated compounds are not free from disadvantages. The dialkyl peroxides, especially the lower ones, are notoriously hazardous to handle because of their sensitivity to heat and shock, which is so high that the dialkyl peroxides have been proposed for use as explosives and detonating agents. Moreover, these peroxides introduce reactive (e.g., oxidizable) alkyl end groups in the polymers. The bis(acyl)peroxides, another class of commonly used initiators, are also generally unstable and even hazardous, have undesirable side reactions, and furnish reactive acyl end groups to the polymers. There was a need for a polymerization process using a stable, non-explosive, easy to handle peroxide of good thermal stability and capable of initiating polymerization without introducing undesirably reactive end groups, thus leading to polymers of good stability.

It is an object of this invention to provide a new catalytic process for the polymerization of polymerizable organic compounds. A further object is to provide a process in which the polymerization of polymerizable ethylenically unsaturated organic compounds is carried out in contact with a new polymerization catalyst. A still further object is to provide a polymerization process using a new stable, non-explosive catalyst which initiates polymerization without introducing undesirably reactive end groups in the polymer. Other objects will appear hereinafter.

In accordance with this invention, the polymerization of polymerizable ethylenically unsaturated compounds is carried out in contact with bis(trifluoromethyl)peroxide as the polymerization initiator. The polymerization is usually run at temperatures of about 100° to about 250° C. in order to obtain a reasonable rate of polymerization. However, temperatures below 100° C. are practicable with the use of ultraviolet light and X-radiation.

Bis(trifluoromethyl)peroxide, $CF_3OOCF_3$, has been obtained in small amounts by electrolysis of trifluoroacetic acid [Swarts, Bull. Soc. Chim., Belg. 42, 102 (1933)]. It is prepared much more conveniently and in satisfactory yields by the methods recently described by Porter and Cady in J. Am. Chem. Soc. 79, 5628 (1957), especially by the silver fluoride-catalyzed reaction of carbon monoxide with fluorine at about 180° C. It is a stable, non-explosive, colorless gas boiling at about −37° C.

The process of this invention is of general application to the polymerization of polymerizable compounds having ethylenic unsaturation, i.e., containing at least one non-aromatic $>C=C<$ group. The term "polymerization" includes, as usual, the polymerization of one ethylenically unsaturated monomer alone as well as the copolymerization of two or more such monomers.

The process of this invention employing bis(trifluoromethyl)peroxide as the polymerization initiator can also be used in the reaction known in the art as telomerization, that is the process whereby modified polymeric products, generally of lower molecular weight, are obtained by carrying out the polymerization in the presence of materials which are non-polymerizable under the conditions employed, but which combine with a plurality of units of the monomer. Examples of such materials are chloroform, carbon tetrachloride, isobutyric acid and anhydride, methyl propionate, dioxolane, ethanethiol, methanol, dibutyl ether, silicon tetrachloride and hydrogen chloride.

Thus, bis(trifluoromethyl)peroxide is an effective initiator for the polymerization of the various classes of ethylenically unsaturated compounds which are capable of polymerization. Such compounds are well-known in the art and need not be enumerated at length. As is known, the principal classes of polymerizable compounds include the ethylenically unsaturated hydrocarbons, especially the vinyl and vinylidene hydrocarbons; the vinyl esters of carboxylic acids; the acrylyl, alkacrylyl and haloacrylyl compounds, e.g., the acids, esters, nitriles and amides; the perfluoroalkenes and chlorofluoroalkenes; the ethylenically unsaturated halohydrocarbons, especially the vinyl and vinylidene chlorides, bromides and fluorides; the N-vinyl imides; the vinyl aldehydes and ketones; the N-vinyl lactams; the vinyl ethers; the vinyl pyridines, and the like. Compounds having more than one ethylenic carbon-to-carbon double bond, particularly the diene hydrocarbons and halohydrocarbons, can also be polymerized with the help of bis(trifluoromethyl)peroxides.

Specific unsaturates polymerizable by the process of this invention include the following, among others: ethylene, propylene, isobutylene, octadecene-1, styrene, alpha-methylstyrene, vinylnaphthalene, 1,3-butadiene, isoprene, vinyl acetate, vinyl butyrate, vinyl laurate, vinyl palmitate, vinyl salicylate, isobutenyl acetate, acrylic acid, ethyl acrylate, methyl methacrylate, n-octyl methacrylate, methoxymethyl methacrylate, beta-diethylaminoethyl methacrylate, ethyl alpha-chloroacrylate, acrylonitrile, methacrylonitrile, acrylamide, methacrylamide, chlorotrifluoroethylene, 1,1-dichloro-2,2-difluoroethylene, tetrafluoroethylene, hexafluoropropylene, perfluoroheptene-1, perfluorononene-1, ethyl trifluoroethylene, 8-hydroperfluorooctene-1, n-dodecyltrifluoroethylene, phenyltrifluoroethylene, alpha-chlorostyrene, vinyl chloride, vinyl fluoride, vinylidene bromide, vinylidene fluoride, 1-chloro-1-fluoroethylene, 2-chloro-1,3-butadiene, N-vinyl phthalimide, N-vinyl succinimide, acrolein, methyl vinyl ketone, N-vinyl butyrolactam, N-vinyl caprolactam, vinyl ethyl ether, vinyl isobutyl ether, and vinyl pyridine.

Illustrative copolymers obtainable by the process of this invention include tetrafluoroethylene/hexafluoropropene copolymers, tetrafluoroethylene/vinylidene fluoride copolymers, ethylene/tetrafluoroethylene copolymers, acrylonitrile/isobutylene copolymers, ethylene/vinyl acetate copolymers, vinyl chloride/vinyl acetate copolymers and methyl methacrylate/styrene copolymers. Even unsaturates which are per se not polymerizable or difficultly polymerizable, such as the dialkyl esters of maleic or fumaric acids, can be copolymerized with readily polymerizable monomers such as styrene or vinyl acetate.

The most readily available polymerizable monomers for use in this process are those having from 2–18 carbon atoms, and they are therefore preferred. Within this group, the best results are obtained with monoethylenically unsaturated monomers having terminal unsaturation, particularly those having a terminal methylene, $CH_2=$, group or a terminal difluoromethylene, $CF_2=$, group. Especially preferred, because they are most successfully amenable to polymerization by this process, are the monoethylenically unsaturated vinyl and vinylidene halides, the vinyl carboxylates, the esters and nitriles of acryilc and alpha-alkacrylic acids, and the polyfluoroalkenes having a terminal difluoromethylene group.

Polymerization is carried out under the well-known conditions normally used in the art to effect polymerization. It is generally carried out at temperatures of at least 100° C., since the reaction is impractically slow below that temperature with most monomers. However, reasonable rates of polymerization below 100° C. are obtained by the use of ultraviolet light and X-radiation. For the upper limit, it is known (Porter and Cady, loc. cit.) that bis(trifluoromethyl)peroxide begins to decompose above about 225° C., with formation of carbonyl fluoride, and it is therefore recommended not to exceed a temperature of about 250° C. in the polymerization reaction. The optimum temperature depends at least in part, of course, on the reactivity of the monomer employed, but in general the preferred operating temperature is in the range of 125–200° C. The polymerization can be conducted at atmospheric pressure and short contact times with sufficiently reactive monomers, but it is in general more conveniently carried out in closed systems, either under the autogenous pressure developed by the ingredients at the operating temperature or under additional pressure, e.g., up to 5000 atmospheres, supplied either by an inert gas or by the monomer, when the latter is a gas that can be injected into the reaction vessel under pressure.

The bis(trifluoromethyl)peroxide need only be used in catalytic amounts in the polymerization mixture, e.g., in amounts between 0.0001 and 0.01 mole per mole of total polymerizable material.

The polymerization may be carried out by any of the conventional methods, e.g., by the bulk, solution, emulsion or granular techniques. Solution polymerization may make use of any substantially inert, unpolymerizable organic liquid which is at least a partial solvent for the monomer, e.g., an aliphatically saturated fluorocarbon liquid under normal conditions. This method gives polymers of excellent quality and it is often preferred. Since bis(trifluoromethyl)peroxide is stable toward water, it is possible to use aqueous systems, with or without addition of one of the conventional dispersing or emulsifying agents. Mixtures of water and an organic solvent for the monomer, preferably a water-miscible one, may be used advantageously.

The invention is illustrated in greater detail in the following examples.

Example I

A pressure vessel of 80 ml. capacity, constructed of a corrosion-resistant nickel-iron-molybdenum alloy, was evacuated, cooled to −80° C., and charged while cold with 30 g. of vinyl fluoride and 20 mg. of bis(trifluoromethyl)peroxide. The peroxide was measured by displacement as a gas at known volume and pressure, according to calculation based on the perfect gas laws. The reaction vessel was heated to 175° C. over a period of 45 minutes and then held at this temperature for 6 hours while being agitated. The internal pressure during this period dropped from 2650 to 1210 lb./sq. in. The reaction vessel was then cooled to room temperature and opened. There was obtained 16 g. of polyvinyl fluoride. Films of this polymer, formed by pressure at 10,000 lb./sq. in. pressure at temperatures in the range of 185–230° C., were tough and transparent.

Example II

Using the apparatus and procedure of Example I, a mixture of 24 g. of vinyl fluoride, 8 g. of hexafluoropropylene and 20 mg. of bis(trifluoromethyl)peroxide was heated at 175° C. for 6 hours, during which time the internal pressure dropped from 2250 to 1930 lb./sq. in. There was obtained 20 g. of a solid copolymer of vinyl fluoride and hexafluoropropylene, whose properties were qualitatively similar to those of the product of Example I.

Example III

In an 80 ml. capacity corrosion-resistant pressure vessel was placed 20 g. of perfluoro(dimethylcyclobutane) [Hauptschein et al., J. Am. Chem. Soc. 80, 842 (1958)] to serve as solvent and diluent in the polymerization reaction. The pressure vessel was cooled to −80° C., evacuated and charged with 12 g. of vinylidene fluoride, 12 g. of hexafluoropropylene and 20 mg. of bis(trifluoromethyl)peroxide. After heating at 175° C. for 6 hours with agitation, during which time the internal pressure fell from 2520 to 1930 lb./sq. in., there was obtained 6.3 g. of a rubbery, acetone-soluble copolymer of vinylidene fluoride and hexafluoropropylene.

Under the same conditions, except that the heating period was 12.5 hours, there was obtained 10.2 g. of a similar copolymer.

Example IV

A 270 ml. capacity corrosion-resistant pressure vessel was cooled to −80° C. and charged with 40 g. of hexafluoropropylene, 40.4 g. of tetrafluoroethylene and 30 mg. of bis(trifluoromethyl)peroxide. The vessel was agitated and heated gradually to 175° C. over a period of 7.5 hours. The pressure in the system reached a maximum of 2355 lb./sq. in. at 128° C. and thereafter dropped slowly while the temperature was raised. The reaction mixture was held at 175° C. for 3.25 hours, during which time the pressure dropped from 1470 to 1340 lb./sq. in. There was obtained 28.7 g. of a white, powdery copolymer of tetrafluoroethylene and hexafluoropropylene.

Example V

Into a thick-walled tube of heat-resistant glass was weighed 5 g. of acrylonitrile and 15 g. of perfluoro(dimethylcyclobutane). The tube was cooled in liquid nitrogen, evacuated to less than 0.1 mm. pressure and 5 mg. of bis(trifluoromethyl)peroxide was introduced as a gas by volume displacement. The tube was sealed while evacuated and cold, and it was then heated at 175° C. for 10 hours. At the end of this period, the tube was again cooled in liquid nitrogen, opened, and its contents were removed. There was obtained 3.9 g. of powdery polyacrylonitrile. A control run in which no bis-trifluoromethyl)peroxide was used gave only a 0.2 g. yield of polymer.

Example VI

Using the apparatus and procedure of Example V, a mixture of 5 g. of vinyl acetate, 15 g. of perfluoro(dimethylcyclobutane) and 5 mg. of bis(trifluoromethyl)peroxide was heated at 175° C. for 10 hours. There was obtained 2 g. of polyvinyl acetate. A control run containing no bis(trifluoromethyl)peroxide gave no polymer.

Example VII

When vinyl chloride was substituted for vinyl acetate in the procedure of Example VI, all other conditions and ingredient proportions being the same, polyvinyl chloride was obtained when bis(trifluoromethyl)peroxide was present, and no polymer when it was absent.

Example VIII

Into a 100 ml. stainless steel reactor was charged 50 ml. of perfluoro(dimethylcyclobutane); the reactor was cooled to −50° C. and evacuated; 0.5 atmosphere of bis(trifluoromethyl)peroxide was bled into the reactor. The reactor was then charged with 25 g. of tetrafluoroethylene, heated to 150° C. and agitated at that temperature for 30 minutes. On cooling, filtering the reaction mixture, washing and drying the product, 16.6 g. of polytetrafluoroethylene was obtained.

Example IX

Into a 100 ml. stainless steel reactor was charged 30 ml. of perfluoro(dimethylcyclobutane), 2.5 g. of hexafluoropropylene and 15 g. of tetrafluoroethylene. Bis(trifluoromethyl)peroxide was injected into the reactor until the pressure had increased by one atmosphere. The vessel was heated to 150° C. and agitated at a temperature of 150–175° C. under autogenous pressure for one hour. On work-up, there was obtained 5.6 g. of a tetrafluoroethylene/hexafluoropropylene copolymer containing approximately 20% of hexafluoropropylene and having a specific melt viscosity of $20.4 \times 10^4$ poises. The polymer could be melt extruded into tough, clear beading.

Bis(trifluoromethyl)peroxide has been found to possess certain advantages as a polymerization initiator in comparison with the commonly used organic peroxides or inorganic persulfates. The principal advantage is that polymers prepared with bis(trifluoromethyl)peroxide as the initiator are free of end groups which are known to impart chemical and thermal instability. For example, tetrafluoroethylene/hexafluoropropylene copolymers prepared as described in Example IX were analyzed for end groups by their characteristic infrared absorption, a sensitive method capable of quantitative determination of carboxyl, acyl fluoride or vinyl end groups. The analyses indicated that none of these groups was present in detectable amounts. These end groups are found to be present in appreciable amounts in polymers prepared with inorganic persulfates or organic peroxides, and their presence has been an impediment to the development of maximum stability in polymeric porducts.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. In a process for the polymerization of a polymerizable ethylenically unsaturated compound, the step which comprises contacting and polymerizing said ethylenically unsaturated compound with a catalytic amount of bis(trifluoromethyl)peroxide as the polymerization initiator at a temperature in the range of 100 to 250° C.

2. In a process for the polymerization of a polymerizable monoethylenically unsaturated monomer having terminal unsaturation, the step which comprises contacting and polymerizing said monoethylenically unsaturated monomer having terminal unsaturation with a catalytic amount of bis(trifluoromethyl)peroxide as the polymerization initiator at a temperature in the range of 100 to 250° C.

3. In a process for the polymerization of a polymerizable vinyl carboxylate, the step which comprises contacting and polymerizing said vinyl carboxylate with a catalytic amount of bis(trifluoromethyl)peroxide as the polymerization initiator at a temperature in the range of 100 to 250° C.

4. In a process for the polymerization of a polymerizable acrylyl compound, the step which comprises contacting and polymerizing said acrylyl compound with a catalytic amount of bis(trifluoromethyl)peroxide as the polymerization initator at a temperature in the range of 100 to 250° C.

5. In a process for the polymerization of a polymerizable monoethylenically unsaturated vinyl halide, the step which comprises contacting and polymerizing said monoethylenically unsaturated vinyl halide with a catalytic amount of bis(trifluoromethyl)peroxide as the polymerization initiator at a temperature in the range of 100 to 250° C.

6. In a process for the polymerization of a polymerizable monoethylenically unsaturated vinylidene halide, the step which comprises contacting and polymerizing said monoethylenically unsaturated vinylidene halide with a catalytic amount of bis(trifluoromethyl)peroxide as the polymerization initiator at a temperature in the range of 100 to 250° C.

7. In a process for the polymerization of a polymerizable monoethylenically unsaturated monomer having a terminal difluoromethylene group, the step which comprises contacting and polymerizing said monoethylenically unsaturated monomer having a terminal difluoromethylene group with a catalytic amount of bis(trifluoromethyl)peroxide as the polymerization initiator at a temperature in the range of 100 to 250° C.

8. In a process for the polymerization of a polymerizable polyfluoroalkene having a terminal difluoromethylene group, the step which comprises contacting and polymerizing said polyfluoroalkene having a terminal difluoromethylene group with a catalytic amount of bis(trifluoromethyl)peroxide as the polymerization initiator at a temperature in the range of 100 to 250° C.

9. In a process as set forth in claim 1, the step which comprises contacting and polymerizing said ethylenically unsaturated compound with a catalytic amount of bis(trifluoromethyl)peroxide as the polymerization initiator at a temperature in the range of 125 to 200° C.

10. In a process for the copolymerization of a polymerizable ethylenically unsaturated compound with at least one other polymerizable ethylenically unsaturated compound, the step which comprises contacting and copolymerizing said ethylenically unsaturated compounds with a catalytic amount of bis(trifluoromethyl)peroxide as the polymerization initiator at a temperature in the range of 100 to 250° C.

11. In a process for the polymerization of tetrafluoroethylene, the step which comprises contacting and polymerizing tetrafluoroethylene with a catalytic amount of bis(trifluoromethyl)peroxide as the polymerization initiator at a temperature in the range of 100 to 250° C.

12. In a process for the copolymerization of tetrafluoroethylene with at least one other polymerizable ethylenically unsaturated compound, the step which comprises contacting and copolymerizing tetrafluoroethylene with at least one other polymerizable ethylenically unsaturated compound with a catalytic amount of bis(trifluoromethyl)peroxide as the polymerization initiator at a temperature in the range of 100 to 250° C.

References Cited in the file of this patent

UNITED STATES PATENTS 2,586,550    Miller _____ Feb. 19, 1952

OTHER REFERENCES

Porter et al.: Journal American Chemical Society 79, 5628 (1957).

Mark et al.: Collected Papers of Wallace H. Carothers, Interscience Pub., Inc., N.Y. (1940), page 115.